US010911558B1

(12) United States Patent
Witzel

(10) Patent No.: US 10,911,558 B1
(45) Date of Patent: Feb. 2, 2021

(54) ON-DEMAND NETWORK SEGMENTATION

(71) Applicant: Pivotal Software, Inc., San Francisco, CA (US)

(72) Inventor: Stev Witzel, Berlin (DE)

(73) Assignee: Pivotal Software, Inc., San Francisco, CA (US)

( * ) Notice: Subject to any disclaimer, the term of this patent is extended or adjusted under 35 U.S.C. 154(b) by 0 days.

(21) Appl. No.: 16/413,462

(22) Filed: May 15, 2019

(51) Int. Cl.
*G06F 15/16* (2006.01)
*H04L 29/08* (2006.01)
*G06F 9/54* (2006.01)
*G06F 9/50* (2006.01)

(52) U.S. Cl.
CPC ........ *H04L 67/2809* (2013.01); *G06F 9/5027* (2013.01); *G06F 9/5077* (2013.01); *G06F 9/54* (2013.01); *H04L 67/2838* (2013.01); *H04L 67/32* (2013.01)

(58) Field of Classification Search
CPC . H04L 67/2809; H04L 67/2838; H04L 67/32; G06F 9/5027; G06F 9/5077; G06F 9/54
USPC ......................................................... 709/226
See application file for complete search history.

(56) References Cited

U.S. PATENT DOCUMENTS

| | | | | |
|---|---|---|---|---|
| 9,264,304 B2 * | 2/2016 | Smith | ................. | H04L 41/0803 |
| 9,294,443 B2 * | 3/2016 | Johnson | .............. | H04L 63/0272 |
| 9,448,826 B2 * | 9/2016 | Banerjee | ............. | G06F 9/45533 |
| 9,639,379 B1 * | 5/2017 | Suit | ..................... | G06F 9/45558 |
| 9,917,912 B2 * | 3/2018 | Almond | .................. | H04L 67/26 |
| 9,935,955 B2 * | 4/2018 | Desai | .................. | H04L 63/0884 |
| 10,129,177 B2 * | 11/2018 | Chang | .................. | H04L 47/829 |
| 10,133,590 B2 * | 11/2018 | Anderson | ........... | G06F 9/45516 |
| 10,152,211 B2 * | 12/2018 | Koushik | ................. | H04L 63/10 |
| 10,187,323 B2 | 1/2019 | Laplanche et al. | | |
| 10,310,903 B2 * | 6/2019 | McPherson | ........... | G06F 9/5027 |
| 10,326,744 B1 * | 6/2019 | Nossik | .................. | H04L 9/0822 |

(Continued)

OTHER PUBLICATIONS

Unknown Author, "On-Demand Services SDK (v0.28)," Pivotal Documentation © 2019 Pivotal Software, Inc. [online] (retrieved from https://docs.pivotal.io/svc-sdk/odb/0-28/), 2 pages.

(Continued)

*Primary Examiner* — Melvin H Pollack
(74) *Attorney, Agent, or Firm* — Fish & Richardson P.C.

(57) ABSTRACT

Methods, systems, and computer readable media for creating segmented virtual networks for service instances. A method includes receiving, by a system controller, a user request requesting creation of a service instance in a software platform system hosting a plurality of service instances. The system controller provides, to a service broker proxy, a request to provision resources for the requested service instance. The service broker proxy creates a new virtual network for the requested service instance. The service broker proxy provides one or more cloud configuration parameters of the new virtual network to a deployment manager that provisions resources in an underlying cloud computing infrastructure. The service broker proxy provides, to an on-demand service broker, a request to provision computing resources in the underlying cloud computing infrastructure to implement the service instance having the one or more cloud configuration parameters. The on-demand service broker provisions computing resources for the service instance.

20 Claims, 5 Drawing Sheets

(56) References Cited

U.S. PATENT DOCUMENTS

| | | | | |
|---|---|---|---|---|
| 10,411,975 | B2* | 9/2019 | Martinez | H04L 41/5054 |
| 10,432,746 | B2* | 10/2019 | Hoffman | H04L 67/10 |
| 10,438,019 | B2* | 10/2019 | Viswanathan | G06F 21/31 |
| 10,476,738 | B1* | 11/2019 | Sharifi Mehr | H04L 43/062 |
| 10,523,531 | B2* | 12/2019 | Zuerner | H04L 41/5054 |
| 10,536,356 | B2* | 1/2020 | Zhong | H04L 41/12 |
| 10,560,541 | B2* | 2/2020 | Barros | G06Q 10/06316 |
| 10,592,269 | B2* | 3/2020 | Wagner | G06F 9/44552 |
| 10,599,499 | B2* | 3/2020 | Caldato | G06F 9/505 |
| 10,609,163 | B2* | 3/2020 | Shah | H04L 67/02 |
| 10,636,082 | B2* | 4/2020 | Gandevia | G06Q 30/08 |
| 10,637,952 | B1* | 4/2020 | Koenig | H04L 67/2809 |
| 10,642,632 | B2* | 5/2020 | Bon | G06F 9/451 |
| 2016/0197850 | A1* | 7/2016 | Peng | H04L 41/12 |
| | | | | 709/226 |
| 2018/0191718 | A1* | 7/2018 | Kuzkin | G06F 8/60 |
| 2019/0166209 | A1* | 5/2019 | Mueller | H04L 67/2838 |
| 2019/0243836 | A1* | 8/2019 | Nanda | G06F 16/258 |
| 2019/0379578 | A1* | 12/2019 | Mishra | H04L 41/5051 |
| 2019/0379579 | A1* | 12/2019 | Mishra | H04L 41/0803 |
| 2020/0036601 | A1* | 1/2020 | Wang | G06F 9/5077 |
| 2020/0073739 | A1* | 3/2020 | Rungta | G06F 9/45558 |
| 2020/0077265 | A1* | 3/2020 | Singh | H04L 67/1097 |
| 2020/0082095 | A1* | 3/2020 | Mcallister | G06F 11/3624 |
| 2020/0097662 | A1* | 3/2020 | Hufsmith | H04L 9/0643 |
| 2020/0110638 | A1* | 4/2020 | Asthana | G06F 9/45533 |
| 2020/0125700 | A1* | 4/2020 | Chang | H04L 63/0807 |

OTHER PUBLICATIONS

Unknown Author, "Open Service Broker API (v2.14)," © 2019 GitHub, Inc. [online] (retrieved from https://github.com/openservicebrokerapi/servicebroker/blob/v2.14/spec.md), 56 pages.

* cited by examiner

ON-DEMAND NETWORK SEGMENTATION

BACKGROUND

This specification generally relates to cloud computing techniques.

In cloud computing, a set of shared computing resources, storage resources, and network resources can be provisioned to users, generally in the form of computing clusters including one or more virtual machines. Multiple physical computing appliances, e.g., computers in a server farm, can provide a service platform for provisioning these resources. The service platform is sometimes referred to as infrastructure as a service (IaaS). A deployment system can automate and simplify transforming a source code or binary code representation of an application into a service instance of that application using IaaS resources. The service instance can then be accessed by end users on a cloud computing platform. An example of a cloud computing platform is a Pivotal Cloud Foundry® software product deployed on a set of cloud appliances. An example deployment system is a BOSH system that deploys and manages service instances on a cloud computing platform.

Container orchestrators can be used to manage containers in the clusters and containerized applications executing in the containers. Setting up the container orchestrator for a particular cloud computing platform requires very labor intensive manual configurations that are based on the desired configuration of the cluster and the properties of the cloud computing platform. In addition, the configurations are not portable to the other cloud computing platform, which means that users would have to perform the labor intensive manual process to execute the same application in a cluster on a different cloud computing platform.

The clusters can be deployed on a service network. For example, clusters that are requested by different users can be deployed on a common service network. However, running containers for different users on the same service network can have potential security implications. For example, an instance of a cluster of one user can potentially access an instance of a cluster of another user.

SUMMARY

This specification describes methods, systems, and computer-readable media for creating segmented virtual networks for service instances. A separate virtual network can be created on demand for each instance of a service instance, e.g., when a request to create the service instance is received.

Particular embodiments of the subject matter described in this specification can be implemented to realize one or more of the following advantages. Generating segmented virtual networks for service instances or other computing tasks can improve the security of the container workloads of the service instances relative to service networks that include service instance of multiple users. For example, the segmented networks can prevent a container workload of one user from accessing a container workload of another user.

A service broker proxy can create a virtual network for each service instance on demand, e.g., in response to a request to create the service instance, and delete, e.g., remove, the virtual network when the service instance is deleted, e.g., removed. This provides greater flexibility and improved efficiency in allocating resources to host the virtual networks. The service broker proxy can intercept or otherwise receive requests to create service instances, create the virtual networks in response to the requests, and provide information about the virtual networks to an on-demand service broker for use in deploying service instances in the virtual networks. The on-demand service broker can manage the lifecycle of the service instance deployed in the virtual network based on the received information. In this way, other components of a cloud system do not have to be modified and users do not have to provide any configuration parameters for the virtual network. This makes it simpler and faster for platform operators to initiate secure service instances, such as secure computing clusters.

The automated and on-demand nature of the segmented virtual networks also saves time for operators and improves the utilization of the network resources. For example, manually creating a virtual network for each instance of a computing cluster (or other service instance) requires a lot of effort and time on the part of a platform operator. Creating virtual networks well in advance of the actual instantiation of service instances rather than at the time of instantiation ties up network resources unnecessarily, resulting in suboptimal utilization and can prevent other service instances from using the network resources even when the resources are not actually being used.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTIONS OF DRAWINGS

Like reference numbers and designations in the various drawings indicate like elements.

DETAILED DESCRIPTION

This specification describes technologies that create segmented virtual networks for service instances such as computing clusters. In this context, being segmented means that each service instance is placed in a separate network different from the network of each other service instance. For example, each segmented network can be a separate subnet that includes a virtual router that enables data communication between the subnet and a backbone network for a software platform system.

A service instance is a managed software offering that can be used by an application or other appropriate entity. For example, an application can be bound to a service instance. Some services will expose some application programming interface (API) that can be invoked to perform some action. However, there can also be non-interactive services that can perform the desired actions without direct prompting from the application. Segmented virtual networks can be created for each service instance of various services such as, for example, computing clusters, database services, messaging systems, and files systems.

A service broker proxy can be placed, e.g., logically, between a system controller that receives user requests to create/delete/modify service instances and a service broker, e.g., an on-demand service broker, that provisions resources for the service instances. The service broker proxy can intercept the requests to create the service instances and create a segmented virtual network for each requested service instance. The service broker proxy can also send cloud configuration parameters of the created virtual network to the on-demand service broker so that the on-demand service broker can include the cloud configuration parameters in a deployment manifest for the service instance. For example, the service broker proxy can augment the original request with cloud configuration parameters of the created virtual network. The on-demand service broker can then provide the deployment manifest to a deployment manager that deploys the service instance in the virtual network. The service broker proxy can also delete the virtual network when the service instance is deleted.

Figure 1:
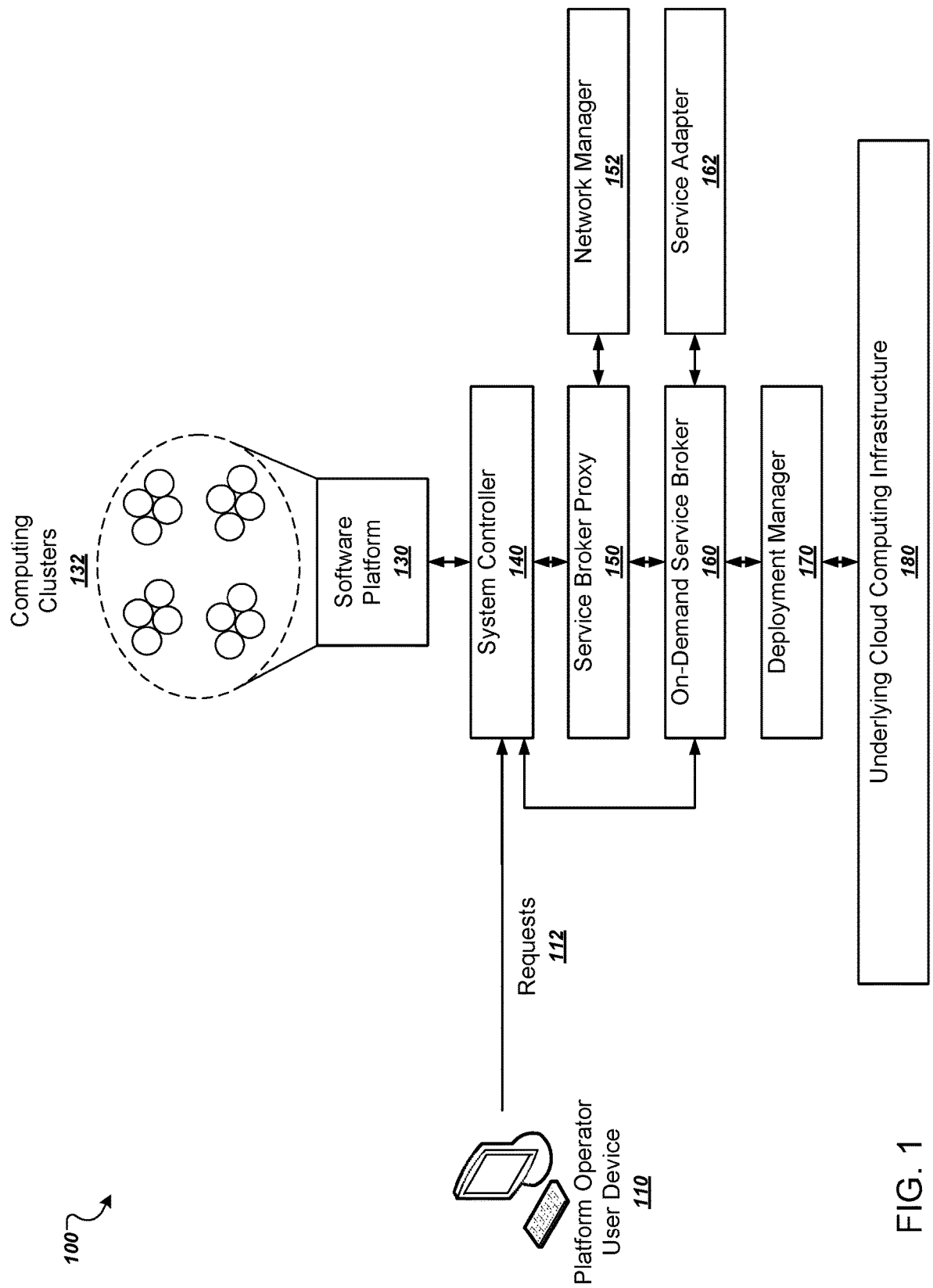
FIG. 1 is a block diagram illustrating an example system that includes a service broker proxy that creates virtual networks for service instances.

FIG. 1 is a block diagram illustrating an example system 100 that includes a service broker proxy 150 that creates virtual networks for service instances. In this example, the service instances are computing clusters 132. However, the service instances can be instances of other types of services, as described above. The system 100 includes a system controller 140. The system controller 140 is a software system that coordinates the setup and management of a software platform system 130. In this example, the software platform system 130 includes a container orchestration platform service that deploys and manages instances of computing clusters 132 to run container workloads. An example container orchestration platform service is Pivotal Container Service, which provides the functionality for launching Kubernetes clusters to run container workloads. Each Kubernetes cluster can be an instantiation of a container orchestration platform, e.g., an instantiation of Kubernetes. The software platform system 130 can host multiple service instances, e.g., multiple computing clusters, for multiple users.

In other examples, the software platform system 130 can be another type of platform, such as a cloud application platform or another appropriate type of software application platform. A cloud application platform is typically an environment designed for high-productivity software development. Therefore, much of the underlying configurations and dependencies are handled automatically, e.g., using frameworks and other integrated development tools, during staging and launching of the applications.

The system 100 can be set up and configured by operators of an entity that maintains the system 100. These can include platform operators that maintain the software platform system 130. Although the system 100 is illustrated as having a single software platform system 130, the system 100 can include multiple software platforms including different types of software platforms, e.g., one or more container orchestration platforms and/or one or more cloud application platforms.

To coordinate the setup and management of the software platform system 130, the system controller 140 can make use of an on-demand service broker 160 and a deployment manager 170 that can provision appropriate resources in an underlying cloud computing infrastructure 180. For example, the deployment manager 170 can be a BOSH tool implemented on one or more computers. BOSH provides a tool chain for packaging, deploying, and managing cloud software. In some implementations, the computing clusters 132 are Kubernetes clusters. In this example, a BOSH deployment manager can deploy and manage Kubernetes clusters on various cloud computing platforms using a deployment manifest.

The on-demand service broker 160 can generate, or cause to be generated, one or more deployment manifests. Each deployment manifest specifies one or more computing resources for a deployment of a service instance, e.g., of a computing cluster. The on-demand service broker 160 can provide the deployment manifest to the deployment manager 170 and the deployment manager 170 can use the deployment manifest to provision computing resources for the service instance.

In some implementations, the on-demand service broker 160 generates a deployment manifest by delegating the generation to a service adapter 162. The service adapter 162 can be an executable, e.g., a binary or a script, that is configured to be invoked by the on-demand service broker 160 to execute on one or more computers. The service adapter 162 performs various service-specific tasks. For example, the service adapter 162 can generate a deployment manifest based on a selected plan. Example on-demand service brokers and service adapters are described in commonly-owned U.S. Pat. No. 10,187,323, issued on Jan. 22, 2019, which is herein incorporated by reference.

The deployment manifest defines the components and properties of the service instance to be deployed. In general, the deployment manifest instructs the deployment manager 170 on how to deploy the service instance. For example, the deployment manifest can define the platform on which service instance is to be deployed, the number of instances of each component, e.g., instances of worker nodes, containers, containerized applications, etc., of an instance of a computing cluster, any credentials needed for users to access the service instances, a deployment identifier, e.g., a name for the deployment, release information, e.g., the name and version of each release in the deployment, network configuration, e.g., for a network that enables nodes, containers, and/or clusters to communicate, properties of virtual machines that will be created and managed by the deployment manager 170, properties of disk pools that will be created and managed by the deployment manager 170, update information that defines how the deployment manager 170 updates job instances during deployment, jobs information that defines the configuration and resource information for jobs, and/or other appropriate information. The deployment manifest can be in the form of a text document, e.g., a YAML, file.

The service broker proxy 150 creates segmented virtual networks for the computing clusters 132, e.g., for each service instance of a computing cluster or other service. The service broker proxy 150 can be arranged logically between the system controller 140 and the on-demand service broker 160. In this example, the service broker proxy 150 can intercept communications between other components of the system, e.g., between the system controller 140 and the on-demand service broker 160. The service broker proxy 150 can obtain, e.g., by way of the system controller 140, user requests 112 to create, modify, delete, or perform other actions with respect to instances of computing clusters 132 or other services that are received from a platform operator user device 110.

For example, the service broker proxy 150 can forward the requests 112, or portions thereof, to the on-demand service broker 160. The service broker proxy 150 can also forward responses to the requests from the on-demand service broker 160 to the API of the system controller 140.

The service broker proxy 150 can also implement a service broker application programming interface (API) of the on-demand service broker 160. The service broker API provides an interface between the software platform system 130 and the on-demand service broker 160. For example, the service broker API can receive requests from the software platform system 130 to create service instances, delete services instances, bind service instances, delete bindings for service instances, upgrade service instances, and view the last operation performed for the services instances. The on-demand service broker 160 can then use the deployment manager 170 to provision or deprovision computing resource for the service instances and/or bindings in response to the requests. In this way, the system controller 140 and the on-demand service broker 160 can be unaware of the service broker proxy 150 such that neither the system controller 140 nor the on-demand service broker 160 have to be modified.

A platform operator or other user can use the user device 110 to create computing clusters, delete computing clusters, or modify, e.g., scale up or down, computing clusters that are deployed in the software platform system 130. The user can submit requests to the system controller 140 using a command-line interface (CLI) or a graphical user interface (GUI). The requests can be received by the API of the system controller 140. The requests can include parameters associated with the request. For example, a user request to create a computing cluster can include a name for the computing cluster, a number of worker nodes, an external host name for the cluster, a plan name for the cluster, and/or other appropriate parameters. A platform operator can use the user device to create, delete, and modify services instances for other services in a similar manner and using similar requests.

In general, the system controller 140 can receive the requests and interact with the on-demand service broker to create, modify, and delete service instances, as described above and described in more detail below. When the system controller 140 receives a user request requesting creation of a service instance in the software platform system 130, the system controller 140 can provide, to the service broker proxy 150, a request to provision resources for the service instance.

The service broker proxy 150 creates a new virtual network for the service instance, e.g., for the computing cluster, and configures the new virtual network for the deployment manager 170. For example, the service broker proxy 150 can interact with a network manager 152, e.g., located in a control plane of a virtual network, to create the virtual network for the service instance. The virtual networks can be software defined networks (SDNs). In some implementations, the virtual networks created by the service broker proxy 150 are VMware NSX-T networks and the network manager 152 is an NSX-T manager. Other SDNs can be used in other implementations.

The service broker proxy 150 can create a segmented virtual network for each service instance that is deployed in the software platform system 130. Each segmented network can be in the form of a subnet that is connected to a backbone network. For example, each service instance can be deployed in a separate NSX-T network and each NSX-T network that includes a service instance can be connected to a backbone NSX-T network via virtual routers. Each NSX-T network can include a router that communicates with a router of the backbone NSX-T network.

When the virtual network is created for a service instance, the service broker proxy 150 can configure the virtual network in the deployment manager 170 by providing cloud configuration parameters for the virtual network to the deployment manager 170. For example, the service broker proxy 150 can create a new cloud configuration file, e.g., a YAML file, that includes cloud configuration parameters of the virtual network. The cloud configuration parameters for a computing cluster can include the name of the computing cluster, the name and type of virtual network, the range of network addresses for the virtual network, and/or other appropriate parameters.

In some implementations, the service broker proxy 150 computes a name for the virtual network based on a unique identifier, e.g., a Globally Unique Identifier (GUID), for the service instance. The service broker proxy 150 can also compute the name of the cloud configuration file based on the unique identifier for the service instance. For example, the name of the virtual network and the name of the cloud configuration file is the unique identifier for the service instance. In some implementations, the unique identifier for the service instance is the name of the service instance. In this example, the name for the virtual network and the name of the cloud configuration file can be the same as the name of the service instance. This ensures that there is a 1-1-1 mapping between the instance identifier, the network name, and the name of the cloud configuration file. This enables the service broker proxy 150 to know which virtual network and which cloud configuration file to delete when the service instance is deleted.

The service broker proxy 150 can provide, to the on-demand service broker 160 a request to provision computing resources in the underlying cloud computing infrastructure 180 to implement a service instance, e.g., a computing cluster. The request can include the cloud configuration parameters, or at least a portion of the parameters. For example, the service broker proxy 150 can add the name of the virtual network to a list of parameters, e.g., name of the service instance, number of worker nodes, etc., that were received with user request to create the service instance. The service broker proxy 150 can then send this adjusted set of parameters to the on-demand service broker 160.

The on-demand service broker 160 can interact with the deployment manager 170 to provision computing resources of the underlying cloud computing infrastructure 180 for the service instance. For example, the on-demand service broker 160 can generate a deployment manifest based on the adjusted set of parameters, e.g., with the help of the service adapter 162 as described above. The on-demand service broker 160 can provide the deployment manifest to the deployment manager 170.

The deployment manager 170 can then provision the required computing resources and launch the computing cluster using the provisioned computing resources, including the virtual network having one or more cloud configuration parameters. The deployment manager 170 can use the cloud configuration file to identify the appropriate virtual network, e.g., based on the name of the virtual network, and deploy the computing cluster in the virtual network. The deployment manager 170 can use the deployment manifest to launch and configure the service instance.

The service broker proxy 150 can also delete the virtual network when the virtual network is no longer needed, e.g., when the computing cluster or other service instance is deleted. The service broker proxy 150 can monitor for a deletion request from the system controller 140. For example, the system controller 140 can send a deletion request to the on-demand service broker 160 in response to receiving a request to a user request to delete the computing cluster received from the user device 110. The service broker proxy 150 can receive the deletion request by implementing the API of the on-demand service broker, as described above. The service broker proxy 150 can provide the deletion request to the on-demand service broker 160. The on-demand service broker 160 can, in turn, provide a request to the deployment manager 170 to delete the computing cluster or other service instance.

After the deployment manager 170 deletes the computing cluster from the software platform system 130, the virtual network and the cloud configuration file still exist. The service broker proxy 150 can delete the virtual network after determining that the computing cluster has been deleted. As described below, the service broker proxy can delete the virtual network for the computing cluster in response to receiving a message indicating that the computing cluster has been successfully deleted from the software platform system 130.

Figure 2:
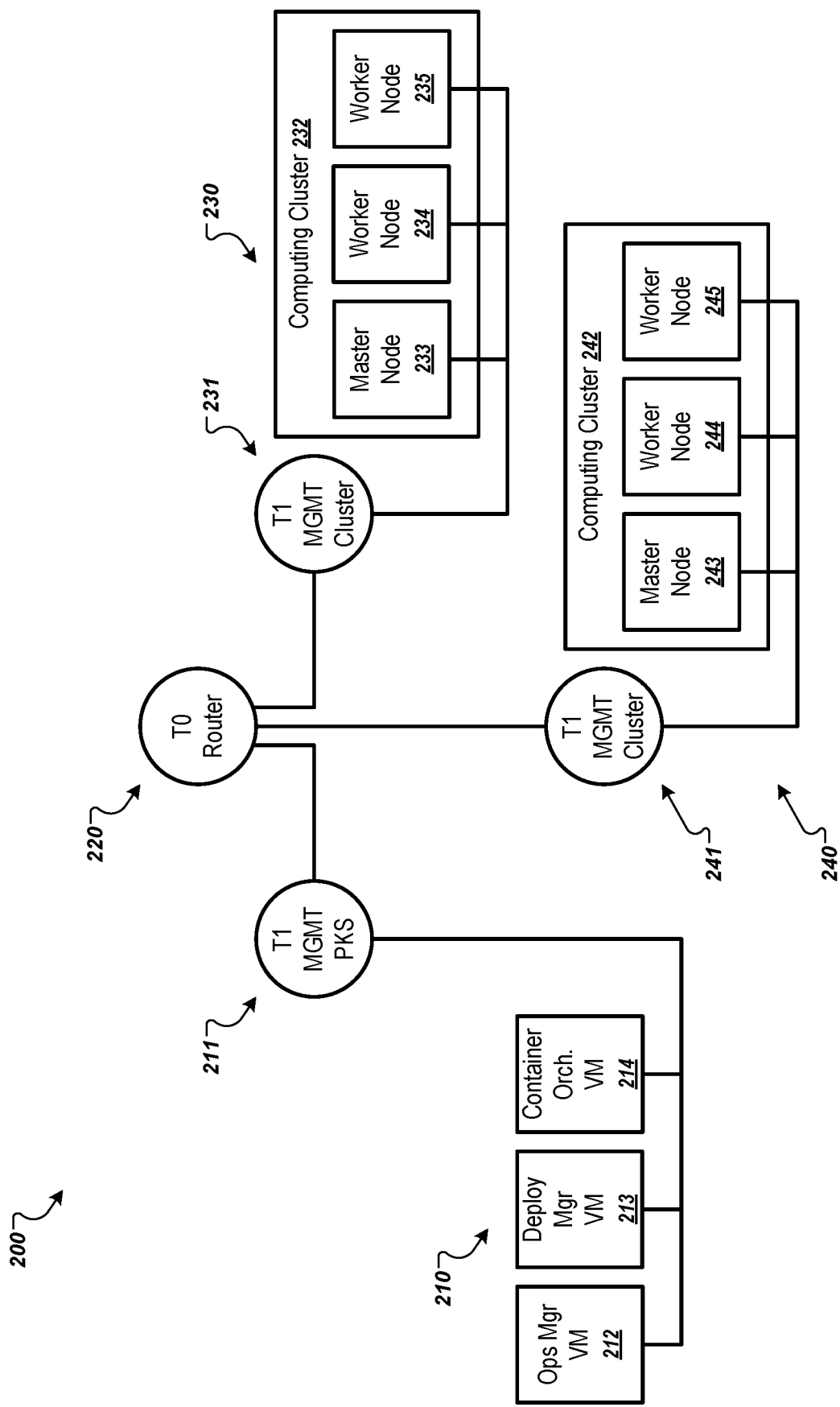
FIG. 2 illustrates example virtual networks for computing clusters.

FIG. 2 illustrates example virtual networks 230 and 240 for computing clusters 232 and 242. Each computing cluster can include one or more master nodes and one or more worker nodes. For example, the computing cluster 232 includes a master node 233 and multiple worker nodes 234 and 235. Similarly, the computing cluster 242 includes a master node 243 and multiple worker nodes 244 and 245. Although each computing cluster 232 and 242 is illustrated as having two worker nodes, computing clusters often have more than two worker nodes and the number of worker nodes can be configurable.

The virtual network 230 for the computing cluster 232 is segmented from the virtual network 240 for the computing cluster 242. For example, each virtual network 230 and 240 includes a virtual router 231 and 241, respectively, that connects its computing cluster to a virtual router 220 that connects the computing clusters 232 and 242 to a backbone network. In this example, the routers 231 and 241 are virtual T1 routers and the virtual router 220 is a T0 router.

The virtual router 220 connects the computing clusters to an operations manager virtual machine 212, a deployment manager virtual machine 213, e.g., a BOSH virtual machine, and a container service virtual machine 214, e.g., a Pivotal Container Service virtual machine, by way of another T1 virtual router 211. The operations manager virtual machine 212 can provide a set of APIs and an interface that enables platform operators to manage the deployment and upgrade of applications, computing clusters, and other service instances. For each deployed service instance, a network manager can create a segmented virtual network, similar to the virtual networks 230 and 240.

The deployment manager virtual machine 213 can provision computing resources in an underlying cloud computing infrastructure for the service instances and deploy the service instances in the virtual networks. For example, the deployment manager virtual machine 213 can provision computing resources for the computing clusters 232 and 242 and deploy the computing clusters 232 and 242 in the virtual networks 230 and 240. The container service virtual machine 214 can deploy and manage the computing clusters 232 and 242.

In some implementations, each segmented virtual network 230 and 240 is a separate NSX-T network managed by an NSX-T network manager. To create the segmented virtual networks, the service broker proxy can send requests for the segmented virtual networks to the network manager of the NSX-T network. Each segmented virtual network 230 and 240 can be created on demand, e.g., in response to a request to deploy the computing cluster 232 and 242, respectively.

Figure 3:
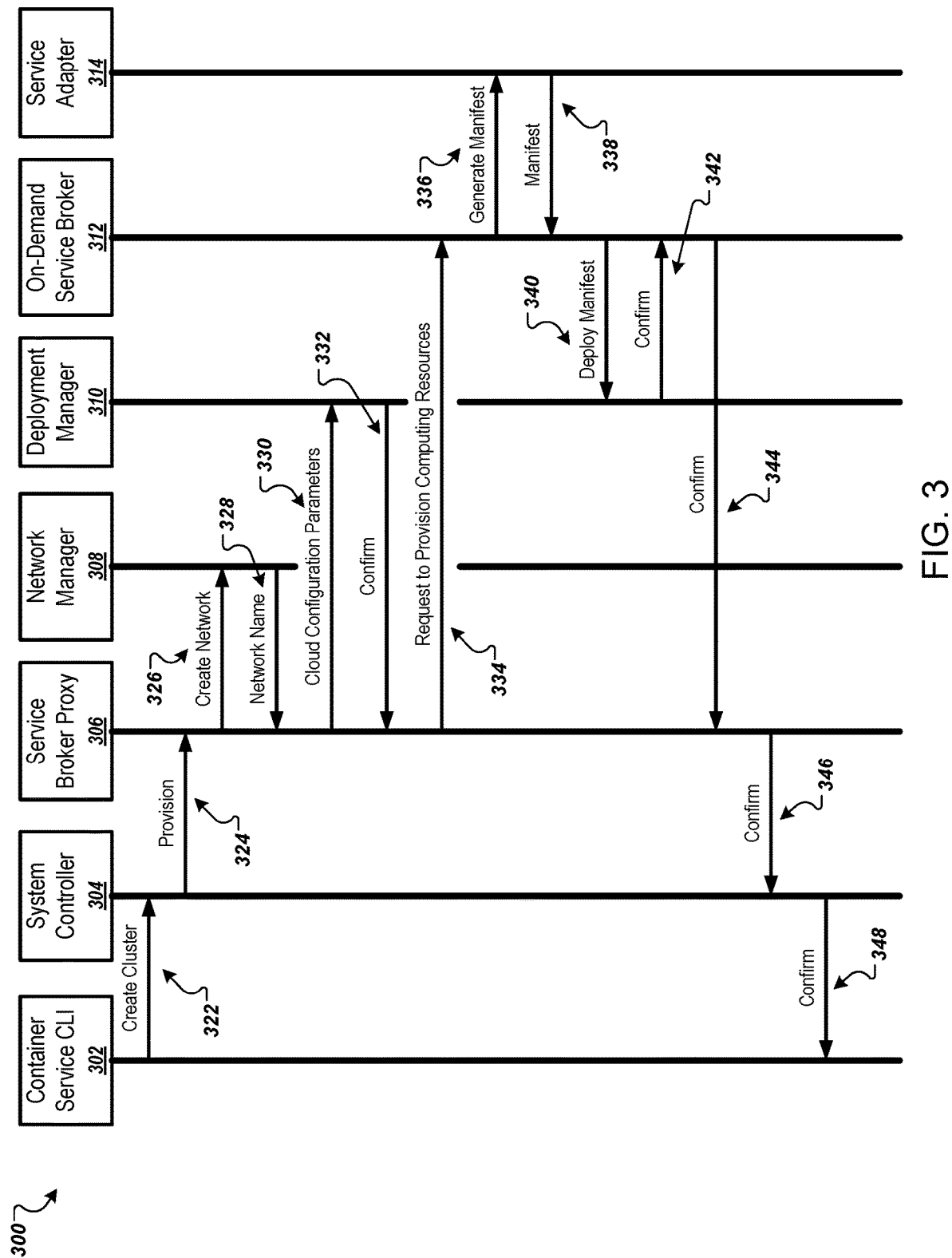
FIG. 3 is a sequence diagram that illustrates user requests and data flow to create a virtual network for a computing cluster.

FIG. 3 is a sequence diagram 300 that illustrates user requests and data flow to create a virtual network for a computing cluster. Although the sequence diagram is described in terms of creating a virtual network for a computing cluster, a similar sequence can be used to create virtual networks for other service instances. A container service CLI 302 provides, to a system controller 304, a user request 322 requesting creation of a computing cluster. For example, the container service CLI can be a CLI presented at a user device, e.g., of a platform operator. The platform operator can enter a request to create a computing cluster. As described above, the request can include a unique name for the computing cluster and parameters of the computing cluster, such as a network address range for the computing cluster.

The system controller 304 provides, to a service broker proxy 306, a request 324 to provision resources for the requested computing cluster. In response, the service broker proxy 306 can provide, to a network manager 308, e.g., an NSX-T control plane, a request 326 to create a virtual network for the requested computing cluster. The network manager 308 can create the virtual network for the requested computing cluster and provide, to the service broker proxy, a unique name 328 for the created virtual network.

The service broker proxy 306 can generate one or more cloud configuration parameters and provide the cloud configuration parameter(s) 330 to a deployment manager 310. As described above, the cloud configuration parameter(s) 330 can include the name of the computing cluster, the name and type of virtual network, the range of network addresses for the virtual network, and/or other appropriate parameters. The deployment manager can confirm 332 receipt of the cloud configuration parameter(s).

The service broker proxy 306 can also provide, to an on-demand service broker 312, a request 334 to provision computing resources for the requested computing cluster. The request can include the name of the virtual network and any parameters received with the user request 322. The service broker proxy 306 can provide the request 334 to the on-demand service broker 312 after providing the cloud configuration parameter(s) 330 to the deployment manager 310.

When the on-demand service broker 312 receives the request 334, the on-demand service broker 312 can provide, to a service adapter, a request 336 to generate a deployment manifest for the requested computing cluster. The request 336 can include any parameters received with the user request 322, as well as the name of the newly created virtual network 328. The service adapter 314 can generate the deployment manifest based on the parameters and provide the generated deployment manifest 338 to the on-demand service broker 312.

In turn, the on-demand service broker 312 can provide, to the deployment manager 310, a request to deploy 340 the requested computing cluster based on the deployment manifest. The deployment manager 310 can use the name of the virtual network to identify the appropriate virtual network for the requested computing cluster. The deployment manager 310 can also use the deployment manifest to launch the computing cluster in the virtual network.

The deployment manager 310 can provide, to the on-demand service broker 312, confirmation 342 that the deployment manager 310 has started provisioning the computing cluster. The on-demand service broker 312 can provide, to the service broker proxy, confirmation 344 that provisioning of the computing cluster is in progress. The service broker proxy 306 can provide, to the system controller 304, confirmation that provisioning of the computing cluster is in progress. In turn, the system controller 304 can provide, to the container service CLI, confirmation that provisioning of the computing cluster is in progress. The user can view the confirmation at the CLI.

Figure 4:
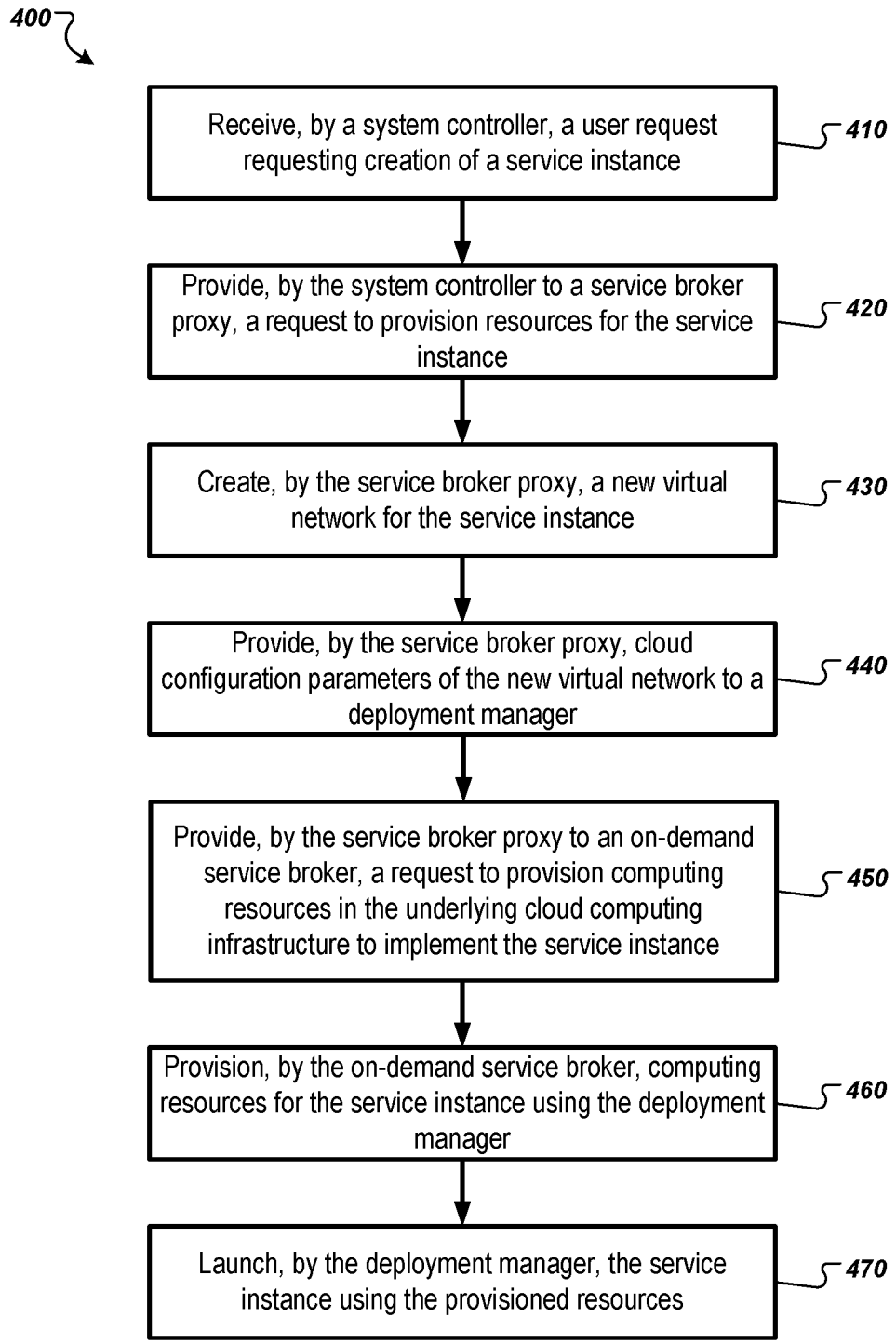
FIG. 4 is a flow chart of an example process for creating a virtual network for a service instance and launching the service instance.

FIG. 4 is a flow chart of an example process 400 for creating a virtual network for a service instance and launching the service instance. For convenience, the process 400 will be described as being performed by a distributed system having a plurality of computers in an underlying cloud computing system and programmed in accordance with this specification. For example, the system 100, appropriately programmed can perform the example process 400.

The system receives a user request requesting creation of a service instance (410). For example, a system controller of the system can receive the user request. A platform operator or other user can use a CLI or GUI of a user device to submit the user request to an API of the system controller. As described above, the user request can include parameters for the service instance, e.g., a name of an instance of a computing cluster and a number of worker nodes for the cluster. The software platform system can host multiple service instances, e.g., multiple computing clusters, for one or more users.

The system controller provides, to a service broker proxy, a request to provision resources for the service instance (420). As described above, the service broker proxy can implement an API of an on-demand service broker and receive the messages or other data intended for the API of the on-demand service broker. In this way, the service broker proxy can intercept messages between the system controller and the on-demand service broker.

The service broker proxy creates a new virtual network for the requested service instance (430). As described above, the service broker proxy can interact with a network manager to create virtual network. The service broker proxy can also generate one or more cloud configuration parameters for the new virtual network, e.g., based on a unique identifier for the requested service instance. The unique identifier for the requested service instance can be the name of the requested service instance.

The service broker proxy can generate a new segmented virtual network for each requested service instance. The service broker proxy can generate the new virtual network for each requested service instance automatically, without any additional input from the user after receiving the user request to create the service instance. For example, the user may not be required to provide any details or configuration parameters for the virtual network. Instead, the service broker proxy can interact with a network manager to create and configure the virtual network.

The service broker proxy provides the cloud configuration parameter(s) for the new virtual network to a deployment manager of the system (440). The cloud configuration parameter(s) can be stored in a YAML file or another appropriate type of file. The service broker proxy can provide the cloud configuration parameter(s) to the deployment manager by providing data specifying a storage location of the file to the deployment manager. As described above, the deployment manager can be a BOSH compliant deployment manager.

The service broker proxy provides, to an on-demand service broker, a request to provision computing resources in the underlying cloud computing infrastructure to implement the requested service instance (450). The service broker proxy can provide, along with the request, any parameters received with the user request, the name of the virtual network, and/or other appropriate parameters.

The on-demand service broker provisions computing resources for the service instance using the deployment manager (460). As described above, the on-demand service broker can generate a deployment manifest based on the parameters received from the service broker proxy. The on-demand service broker can provide the deployment manifest to the deployment manager. The deployment manager can provision computing resources for the requested service instance based on the deployment manifest. For example, the deployment manifest can specify the number of instances of worker nodes for an instance of a requested computing cluster. The deployment manager can provision computing resources for each service instance.

The deployment manager launches the service instance using the provisioned resources (470). The deployment manager can launch the service instance in the new virtual network. For example, the deployment manager can use the name of the virtual network to identify the virtual network in the software platform system and launch the service instance on the virtual network. The deployment manager can also use a range of network addresses specified by the cloud configuration parameters to assign network addresses on the virtual network to the components of the service instance.

Figure 5:
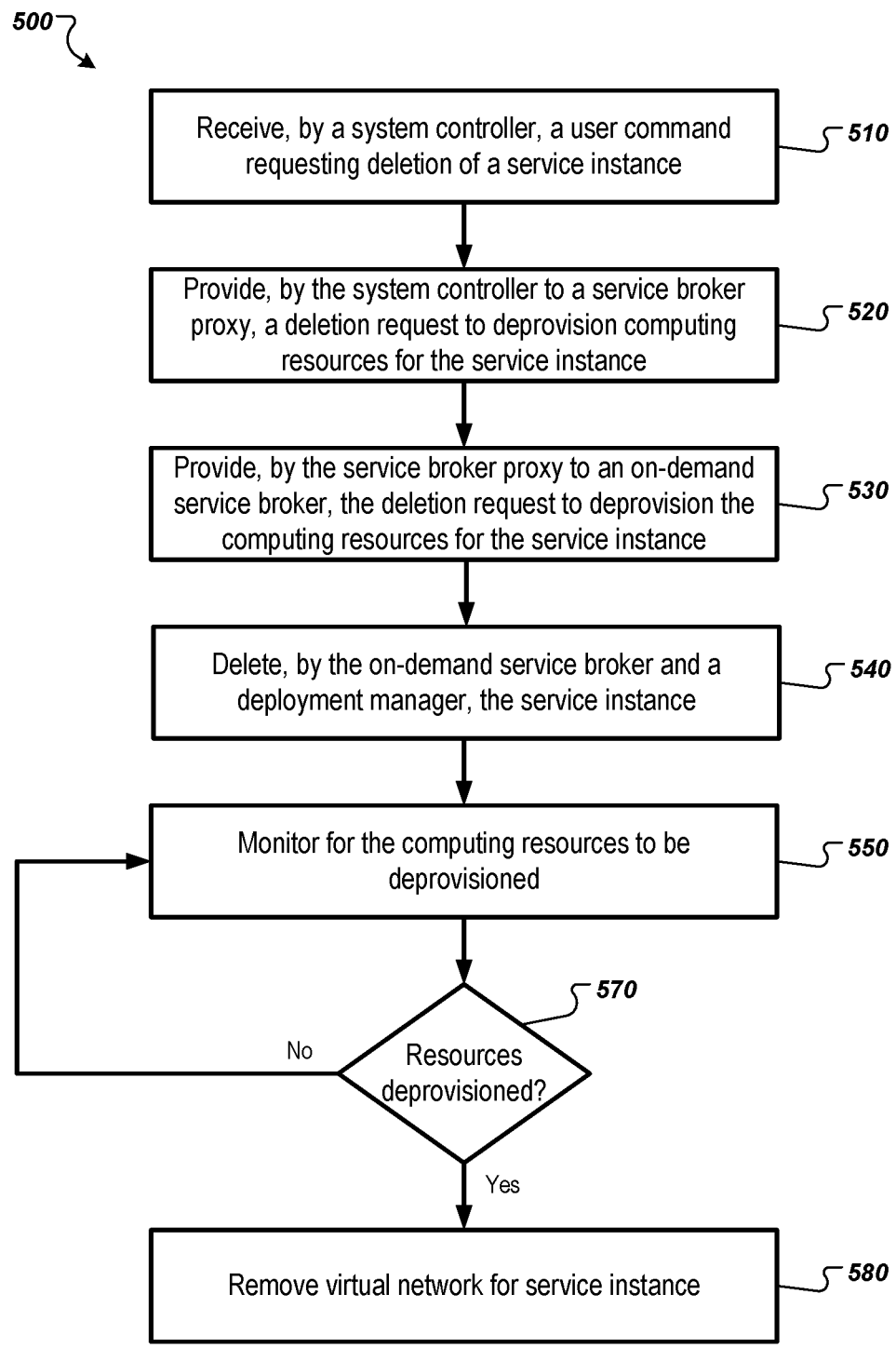
FIG. 5 is a flow chart of an example process for deleting a virtual network for a deleted service instance.

FIG. 5 is a flow chart of an example process 500 for deleting a virtual network for a deleted service instance. For convenience, the process 500 will be described as being performed by a distributed system having a plurality of computers in an underlying cloud computing system and programmed in accordance with this specification. For example, the system 100, appropriately programmed can perform the example process 500.

A system controller of the system receives a user request requesting to delete a service instance (510). For example, a user can submit a deletion request using a CLI or GUI of a user device. The user request can specify the name of the service instance to delete from a software platform system.

The system controller provides, to a service broker proxy, a deletion request to deprovision computing resources for the service instance (520). As described above, computing resources are provisioned for the service instance when the computing cluster is created. This deletion request is to request that the provisioned computing resources for the service instance are released for use by other computing tasks, e.g., other computing clusters.

The service broker proxy provides, to an on-demand service broker, the deletion request to deprovision the computing resources for the service instance (530). The on-demand service broker can be the same on-demand service broker that provisioned the computing resources for the service instance using the deployment manager. As described above, the service broker proxy can receive requests from the system controller by implementing the API for the on-demand service broker.

The on-demand service broker and the deployment manager deletes the service instance (540). For example, the on-demand service broker can provide, to the deployment manager, a request to delete the service instance and to deprovision the computing resources for the service instance. When the deployment manager receives and/or accepts the request to delete the service instance, the deployment manager can send confirmation that it will delete the service instance to the on-demand service broker. In turn, the on-demand service broker can confirm to the service broker proxy that the service instance will be deleted. The service broker proxy can provide similar confirmation to the system controller.

At this point, the virtual network and corresponding cloud configuration file still exist. However, the virtual network should not be deleted until the service instance has been successfully deleted and the computing resources for the service instance have been deprovisioned.

The service broker proxy monitors for the computing resources to be successfully deprovisioned (560). To determine when the service instance has been successfully deleted and the computing resources have been successfully deprovisioned, the service broker proxy can rely on the fact that the API of the system controller keeps polling the on-demand service broker for the last operation endpoint to obtain the state of the last requested operation until it reports a success. The service broker proxy can intercept those polling requests and check the response from the on-demand service broker.

The service broker proxy can determine whether the computing resources for the service instance have been successfully deprovisioned based on the responses to the polling requests (570). Whenever the service broker proxy detects a response that indicates that the last operation, i.e., deprovision the computing resources for the service instance, was successful, the service broker can determine that the computing resources have been successfully deprovisioned. For example, if the response body includes a particular message, e.g., "operation: deprovision and state: succeeded," in a BOSH deployment, the service broker proxy can determine that the computing resources for the service instance have been successfully deprovisioned.

If the service broker proxy determines that the computing resources for the service instance have not yet been successfully deprovisioned, the service broker proxy can forward the response that it received from the service broker to the system controller, which will continue to monitor the progress of the deletion by subsequent polling requests. The service broker proxy can continue intercepting the responses to determine whether the service instance has been successfully deprovisioned.

If the service broker proxy determines that the computing resources for the service instance have been successfully deprovisioned, the service broker proxy can delete the virtual network for the computing cluster (580). To do so, the service broker proxy can compute the names of the cloud configuration file and the virtual network based on the unique identifier for the service instance. The service broker proxy can then use those names to delete the cloud configuration file from the deployment manager and instruct the network manager to delete the virtual network. When both are complete, the service broker proxy can confirm to the system controller that the virtual network has been deleted, e.g., by simply forwarding the original response that the service broker proxy received from the service broker.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS)

receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communications network. Examples of communications networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

In addition to the embodiments described above, the following embodiments are also innovative:

Embodiment 1 is a method comprising:
  receiving, by a system controller, a user request requesting creation of a service instance in a software platform system hosting a plurality of service instances;
  providing, by the system controller to a service broker proxy, a request to provision resources for the requested service instance;
  creating, by the service broker proxy, a new virtual network for the requested service instance;
  providing, by the service broker proxy, one or more cloud configuration parameters of the new virtual network to a deployment manager that provisions resources in an underlying cloud computing infrastructure;
  providing, by the service broker proxy to an on-demand service broker, a request to provision computing resources in the underlying cloud computing infrastructure to implement the service instance having the one or more cloud configuration parameters;
  provisioning, by the on-demand service broker, computing resources for the service instance using the deployment manager; and
  launching, by the deployment manager, the service instance using the provisioned computing resources including new virtual network having the one or more cloud configuration parameters of the new virtual network.

Embodiment 2 is the method of embodiment 1, wherein the service broker proxy implements a service broker application programming interface (API) that provides an interface between the software platform system and the on-demand service broker, including receiving requests from the software platform system to create service instances, delete services instances, bind service instances, and delete bindings for service instance.

Embodiment 3 is the method of embodiment 1 or 2, wherein the deployment manager is a BOSH tool implemented on one or more computers.

Embodiment 4 is the method of any one of embodiments 1-3, wherein the service broker proxy creates a separate virtual network for each requested service instance.

Embodiment 5 is the method of any one of embodiments 1-4, further comprising:
  receiving, by the system controller, a second user request requesting deletion of the service instance;
  providing, by the system controller to the service broker proxy, a deletion request to deprovision the computing resources for the service instance;
  providing, by the service broker proxy to the on-demand service broker, the deletion request to deprovision the computing resources for the service instance;
  detecting, by the service broker proxy, that the computing resources for the service instance have been deprovisioned; and
  in response to detecting that the computing resources for the service instance have been deprovisioned, deleting the new virtual network.

Embodiment 6 is the method of embodiment 5, wherein detecting, by the service broker proxy, that the computing resources for the service instance have been deprovisioned comprises monitoring for a message from the on-demand service broker to the system controller that indicates that the computing resources for the service instance have been successfully deprovisioned.

Embodiment 7 is the method of any one of embodiments 1-6, wherein creating, by the service broker proxy, the new virtual network for the requested service instance comprises generating the cloud configuration parameters based on a unique identifier for the requested service instance, the cloud configuration parameters including a name for the new virtual network.

Embodiment 8 is the method of any one of embodiments 1-7, wherein the requested service instance is an instance of a computing cluster.

Embodiment 9 is a system comprising: a plurality of computers and one or more storage devices storing instructions that are operable, when executed by the one or more computers, to cause the one or more computers to perform the method of any one of embodiments 1-8.

Embodiment 10 is a computer storage medium encoded with a computer program, the program comprising instructions that are operable, when executed by a plurality of computers, to cause the plurality of computers to perform the method of any one of embodiments 1-8.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, the subject matter is described in context of scientific papers. The subject matter can apply to other indexed work that adds depth aspect to a search. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A method performed by a distributed computing system comprising a plurality of computers, the method comprising:
   receiving, by a system controller, a user request requesting creation of one or more service instances in a software platform system hosting a plurality of service instances;
   providing, by the system controller to a service broker proxy, a request to provision resources for each requested service instance;
   in response to receiving the request to provision resources for each requested service instance, creating, by the service broker proxy, a respective separate new virtual network for each requested service instance;
   for each requested service instance:
      providing, by the service broker proxy, one or more cloud configuration parameters of the respective separate new virtual network for the requested service instance to a deployment manager that provisions resources in an underlying cloud computing infrastructure;
      providing, by the service broker proxy to an on-demand service broker, a request to provision computing resources in the underlying cloud computing infrastructure to implement the requested service instance having the one or more cloud configuration parameters;
      provisioning, by the on-demand service broker, computing resources for the requested service instance using the deployment manager; and
      launching, by the deployment manager, the requested service instance using the provisioned computing resources including launching the service instance in the respective separate new virtual network having the one or more cloud configuration parameters of the respective separate new virtual network.

2. The method of claim 1, wherein the service broker proxy implements a service broker application programming interface (API) that provides an interface between the software platform system and the on-demand service broker, including receiving requests from the software platform system to create service instances, delete services instances, bind service instances, and delete bindings for service instance.

3. The method of claim 1, wherein the deployment manager is a BOSH tool implemented on one or more computers.

4. The method of claim 1, further comprising:
   receiving, by the system controller, a second user request requesting deletion of a particular service instance;
   providing, by the system controller to the service broker proxy, a deletion request to deprovision the computing resources for the particular service instance;
   providing, by the service broker proxy to the on-demand service broker, the deletion request to deprovision the computing resources for the particular service instance;
   detecting, by the service broker proxy, that the computing resources for the particular service instance have been deprovisioned; and
   in response to detecting that the computing resources for the particular service instance have been deprovisioned, deleting the new virtual network.

5. The method of claim 4, wherein detecting, by the service broker proxy, that the computing resources for the particular service instance have been deprovisioned comprises monitoring for a message from the on-demand service broker to the system controller that indicates that the computing resources for the particular service instance have been successfully deprovisioned.

6. The method of claim 1, wherein creating, by the service broker proxy, the respective separate new virtual network for each requested service instance comprises generating the cloud configuration parameters of each respective separate new virtual network based on a respective unique identifier for each requested service instance, the cloud configuration parameters of each respective separate new virtual network including a name for the respective separate new virtual network.

7. The method of claim 1, wherein at least one requested service instance of the one or more requested service instances is an instance of a computing cluster.

8. A distributed computing system comprising a plurality of computers and one or more storage devices storing instructions that are operable, when executed by the plurality of computers, to cause the plurality of computers to perform operations comprising:
   receiving, by a system controller, a user request requesting creation of one or more service instances in a software platform system hosting a plurality of service instances;

providing, by the system controller to a service broker proxy, a request to provision resources for each requested service instance;

in response to receiving the request to provision resources for each requested service instance, creating, by the service broker proxy, a respective separate new virtual network for each requested service instance;

for each requested service instance:

providing, by the service broker proxy, one or more cloud configuration parameters of the respective separate new virtual network for the requested service instance to a deployment manager that provisions resources in an underlying cloud computing infrastructure;

providing, by the service broker proxy to an on-demand service broker, a request to provision computing resources in the underlying cloud computing infrastructure to implement the requested service instance having the one or more cloud configuration parameters;

provisioning, by the on-demand service broker, computing resources for the requested service instance using the deployment manager; and launching, by the deployment manager, the requested service instance using the provisioned computing resources including launching the service instance in the respective separate new virtual network having the one or more cloud configuration parameters of the respective separate new virtual network.

9. The system of claim 8, wherein the service broker proxy implements a service broker application programming interface (API) that provides an interface between the software platform system and the on-demand service broker, including receiving requests from the software platform system to create service instances, delete services instances, bind service instances, and delete bindings for service instance.

10. The system of claim 8, wherein the deployment manager is a BOSH tool implemented on one or more computers.

11. The system of claim 8, wherein the operations comprise:

receiving, by the system controller, a second user request requesting deletion of a particular service instance;

providing, by the system controller to the service broker proxy, a deletion request to deprovision the computing resources for the particular service instance;

providing, by the service broker proxy to the on-demand service broker, the deletion request to deprovision the computing resources for the particular service instance;

detecting, by the service broker proxy, that the computing resources for the particular service instance have been deprovisioned; and in response to detecting that the computing resources for the particular service instance have been deprovisioned, deleting the new virtual network.

12. The system of claim 11, wherein detecting, by the service broker proxy, that the computing resources for the particular service instance have been deprovisioned comprises monitoring for a message from the on-demand service broker to the system controller that indicates that the computing resources for the particular service instance have been successfully deprovisioned.

13. The system of claim 8, wherein creating, by the service broker proxy, the respective separate new virtual network for each requested service instance comprises generating the cloud configuration parameters of each respective separate new virtual network based on a respective unique identifier for each requested service instance, the cloud configuration parameters of each respective separate new virtual network including a name for the respective separate new virtual network.

14. The system of claim 8, wherein at least one requested service instance of the one or more requested service instances is an instance of a computing cluster.

15. One or more non-transitory computer storage media encoded with computer program instructions that when executed by a distributed system comprising a plurality of computers cause the plurality of computers to perform operations comprising:

receiving, by a system controller, a user request requesting creation of one or more service instances in a software platform system hosting a plurality of service instances;

providing, by the system controller to a service broker proxy, a request to provision resources for each requested service instance;

in response to receiving the request to provision resources for each requested service instance, creating, by the service broker proxy, a respective separate new virtual network for each requested service instance;

for each requested service instance:

providing, by the service broker proxy, one or more cloud configuration parameters of the respective separate new virtual network for the requested service instance to a deployment manager that provisions resources in an underlying cloud computing infrastructure;

providing, by the service broker proxy to an on-demand service broker, a request to provision computing resources in the underlying cloud computing infrastructure to implement the requested service instance having the one or more cloud configuration parameters;

provisioning, by the on-demand service broker, computing resources for the requested service instance using the deployment manager; and launching, by the deployment manager, the requested service instance using the provisioned computing resources including launching the service instance in the respective separate new virtual network having the one or more cloud configuration parameters of the respective separate new virtual network.

16. The one or more non-transitory computer storage media of claim 15, wherein the service broker proxy implements a service broker application programming interface (API) that provides an interface between the software platform system and the on-demand service broker, including receiving requests from the software platform system to create service instances, delete services instances, bind service instances, and delete bindings for service instance.

17. The one or more non-transitory computer storage media of claim 15, wherein the deployment manager is a BOSH tool implemented on one or more computers.

18. The method of claim 1, wherein each new virtual network comprises a segmented subnet and each segmented subnet comprises a virtual router for data communication between the segmented subnet and a backbone network of the software platform system.

19. The method of claim 1, wherein providing, by the system controller to the service broker proxy, the request to provision resources for each requested service instance comprises, intercepting, by the service broker proxy, the user request.

20. The method of claim 1, wherein launching, by the deployment manager, the requested service instance comprises identifying, in a backbone network of the software platform system, the respective separate new virtual network for the requested service instance using the one or more cloud configuration parameters of the respective separate new virtual network.

* * * * *